United States Patent [19]

Hornak et al.

[11] Patent Number: 5,325,408
[45] Date of Patent: Jun. 28, 1994

[54] DEVICE FOR TRANSFERRING A POISON ROD ASSEMBLY FROM ONE FUEL ASSEMBLY TO ANOTHER FUEL ASSEMBLY

[75] Inventors: Leonard P. Hornak, Wilkins Township, Allegheny County; David J. Stefko, Penn Township, Westmoreland County, both of Pa.

[73] Assignee: Westinghouse Electric Corporation, Pittsburgh, Pa.

[21] Appl. No.: 69,225

[22] Filed: May 28, 1993

[51] Int. Cl.⁵ ............................................. G21C 19/11
[52] U.S. Cl. ..................................... 376/260; 376/262
[58] Field of Search ............... 376/260, 262, 264, 268, 376/271; 294/906

[56] References Cited

U.S. PATENT DOCUMENTS

| | | |
|---|---|---|
| 3,768,668 | 10/1973 | Schukei ................................ 376/262 |
| 3,990,591 | 11/1976 | Street et al. ......................... 376/262 |
| 4,030,973 | 6/1977 | Hoffmeister et al. ................ 376/262 |
| 4,086,132 | 4/1978 | Meuschke et al. ................... 376/262 |
| 4,772,446 | 9/1988 | Meuschke ............................ 376/262 |
| 5,227,125 | 7/1993 | Beneck et al. ....................... 376/260 |

*Primary Examiner*—Daniel D. Wasil
*Attorney, Agent, or Firm*—Peyton C. Watkins

[57] ABSTRACT

A device for transferring a poison rod assembly from one fuel assembly to another fuel assembly. The device comprising winch means cooperatively associated with the poison rod assembly for lifting and transferring the poison rod assembly; a tubular member attached to the winch means at one end and adapted to be attached to the poison rod assembly at its other end.for latching onto the poison rod assembly; motor means attached to the winch means for driving the winch means; and actuator means communicating with the tubular member for moving the tubular member in an arcuate motion for latching the tubular member to the poison rod assembly.

4 Claims, 5 Drawing Sheets

DEVICE FOR TRANSFERRING A POISON ROD ASSEMBLY FROM ONE FUEL ASSEMBLY TO ANOTHER FUEL ASSEMBLY

BACKGROUND OF THE INVENTION

1. Field of the Invention

The invention relates to a device for rearranging poison rod assemblies positioned in a fuel assembly between a plurality of fuel assemblies and, more particularly, relates to a motorized device for such rearranging of the poison rod assemblies between fuel assemblies.

2. Description of the Prior Art

In a commercial nuclear reactor, heat, from which steam and ultimately electricity are generated, is produced by fissioning of a fissible material, such as enriched uranium, contained in a reactor vessel. The reactor vessel includes a flanged closure head bolted atop a flanged reactor body; the reactor vessel being entirely contained within a containment building. This fissile material, or nuclear fuel, is typically contained within a reactor nuclear core formed from a multiplicity of fuel rods supported in a plurality of nuclear fuel assemblies, coextensively arranged in a spaced parallel array.

In addition, poison rods are dispersed throughout the core and, more specifically, throughout the fissionable material to properly disperse the fissionable process within the core. The poison rods generally include a plurality of elongated rods each containing neutron absorbing materials which fit in longitudinal openings defined in the fuel assemblies. A web shaped top portion joins the poison rods together forming a poison rod assembly. A T-shaped bar is affixed atop the web shaped top forming an easily accessible handle for lifting the poison rod assemblies during maintenance or the like.

During such maintenance, refueling or the like, the reactor closure head is unbolted, and the fuel assemblies, containing the poison rod assemblies, are removed from the reactor vessel, transported to a fuel storage building and positioned in storage racks by means well known in the art. The fuel storage building may contain water having boric acid therein for properly storing the fuel assemblies. The storage racks include a plurality of cavities coextensively arranged in a spaced apart, rectangular array, although any shaped array may be utilized. The poison rod assemblies are then repositioned between different fuel assemblies so that unusable poison rod assemblies are mated with unusable fuel rods forming a spent fuel assembly. After a sufficient decay period, the spent fuel assemblies are removed from the storage racks and loaded into a shipping cask for removal from the site.

A presently known and utilized device for rear-ranging the poison rod assemblies between the fuel assemblies includes a platform which is suspended over the fuel assemblies by a movable bridge. A manually operated winch is positioned on the platform and includes a cable attached to an elongated, tubular member having two notches for lifting the poison rod assemblies. An actuator is also positioned on the platform and communicates with the tubular member for circularly rotating the tubular member into a position which latches the notches onto the T-shaped bar of the poison rod assembly.

To remove a poison rod assembly, the winch is manually cranked which, in turn, lowers the tubular member to a position adjacent the T-shaped bar of the poison rod assembly. The actuator communicates with and circularly rotates the tubular member thereby passing the notches of the tubular member around the T-shaped bar. After the actuator moves the tubular member into the latched position, the winch is again cranked by maintenance personnel standing on the movable bridge, and this cranking, thus, lifts the poison rod assembly from the fuel assembly. The movable bridge is maneuvered over another fuel assembly, and the poison rod assembly is lowered into a predetermined fuel assembly by the winch. The actuator then rotates the tubular member to detach the tubular member from the T-shaped bar of the poison rod assembly. The above described process is then repeated for repositioning other poison rod assemblies.

Although the present device for rearranging the poison rod assemblies is satisfactory, it is not without drawbacks. When a large quantity of poison rod assemblies are required to be rearranged, as is usually the case, the present method is time consuming partially because of the time it takes to manually manipulate the winch.

Consequently, a need exists for an improved device for rearranging poison rod assemblies between a plurality of fuel assemblies.

SUMMARY

Accordingly, the present invention is directed to a device for transferring a poison rod assembly from one fuel assembly to another fuel assembly, the device comprising: (a) winch means cooperatively associated with the poison rod assembly for lifting and transferring the poison rod assembly; b) a tubular member attached to said winch means at one end and adapted to be attached the poison rod assembly at its other end for latching onto the poison rod assembly; c) motor means attached to the winch means for driving the winch means; and d) actuator means communicating with said tubular member for moving said tubular member in an arcuate motion for latching said tubular member to the poison rod assembly.

DESCRIPTION OF THE PREFERRED EMBODIMENT

Figure 1:
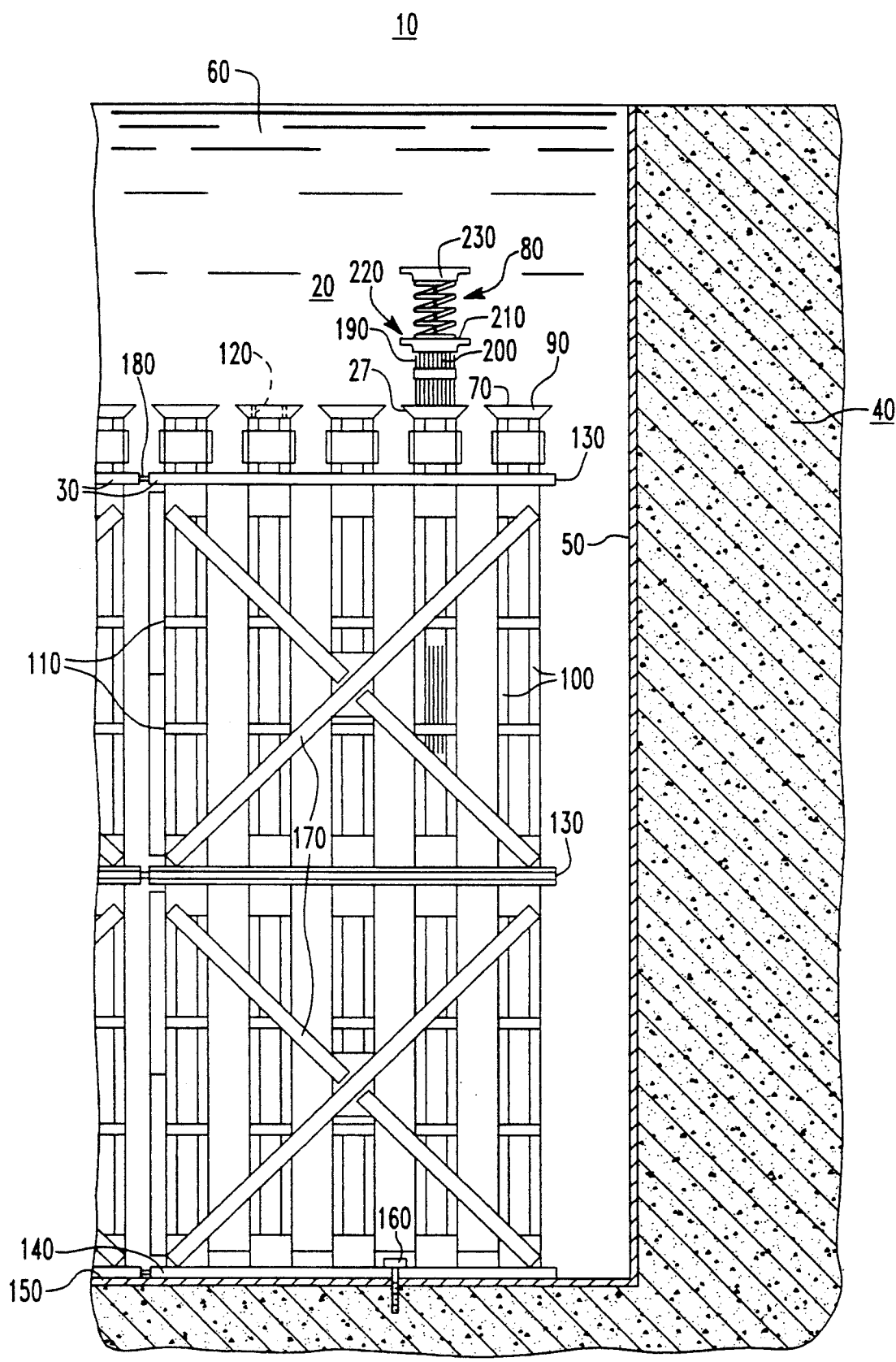
FIG. 1 is a side elevation view of a portion of a fuel storage building which contains fuel racks.

In the following description, like reference characters designate like or corresponding parts throughout the several views of the drawings. Also, in the following description, it is to be understood that such terms as "forward", "left", "right", "upwardly", "downwardly", and the like are words of convenience and are not to be construed as limiting terms.

Referring now to the drawings, and particularly to FIG. 1, there is illustrated a portion of a fuel handling building 10 defining a spent fuel pit 20 which contains a plurality of spent fuel racks 30. The pit 20 is a sealed enclosure, typically rectangular, comprised of supporting concrete 40 and a sealed metallic liner 50. Prior to placing spent fuel in the pit 20, it is filled with a shielding medium, such as water 60 containing boric acid. Each fuel rack 30 includes a plurality of vertically oriented, spaced apart cells 70 each of which is sized to receive a fuel assembly 80 which will be described later in detail. Each cell 70 can also be provided with a metallic can 90 to receive and shield the assemblies from one another. Each of the racks 30 includes twenty-five cells 70 in a five-by-five, rectangular- shaped array, although any sized array can be utilized. Each cell 70 may be fabricated from four stainless steel, L-shaped angles 100, one for each of four corners, with a plurality of support plates or straps 110 affixed to the angles 100 at preselected elevations to form the basic cell 70 for fuel assembly 80 storage. The metallic can 90 may include a square funnel affixed at the top of its associated cell to guide a fuel assembly 80 into its storage position, or to extend the length of the cell 70. The can 90 includes two bores 120 at two diagonally opposite corners of each can 90; each bore 120 is sized to receive a portion of a handling tool (not shown) which may be used to retract a portion of the fuel assembly 80. The cells 70 are maintained in their spaced apart, pre-determined array by two rectangular shaped members 130 each having a plurality of joists (not shown) therein forming a plurality of rectangular slots (not shown) for receiving each cell 70. The bottom of each cell 70 may be joined to a bottom plate 140 resting atop a floor 150, and may be affixed to the floor 150 by means such as bolts 160. The fuel racks 30 additionally include a plurality of X-shaped metallic beams 170 joining the cells 70 together for support. The cells 70 may also be affixed to one another through mechanical connectors 180.

As also seen in FIG. 1, each fuel assembly 80 is formed, in part, from the fuel rods 190 which are intermixed with the poison rods 200. The fuel rods 190 are positioned generally on the periphery of the fuel assembly 80, and the poison rods 200 are positioned generally in an inner portion of the fuel assembly 80. However, only the poison rods 200 are joined at their respective top portions by a web shaped top portion 210 thereby forming a poison rod assembly 220. A T-shaped bar 230 extends upwardly from the top portion 210 forming an easily accessible handle for lifting the poison rod assembly 220.

Figure 2:
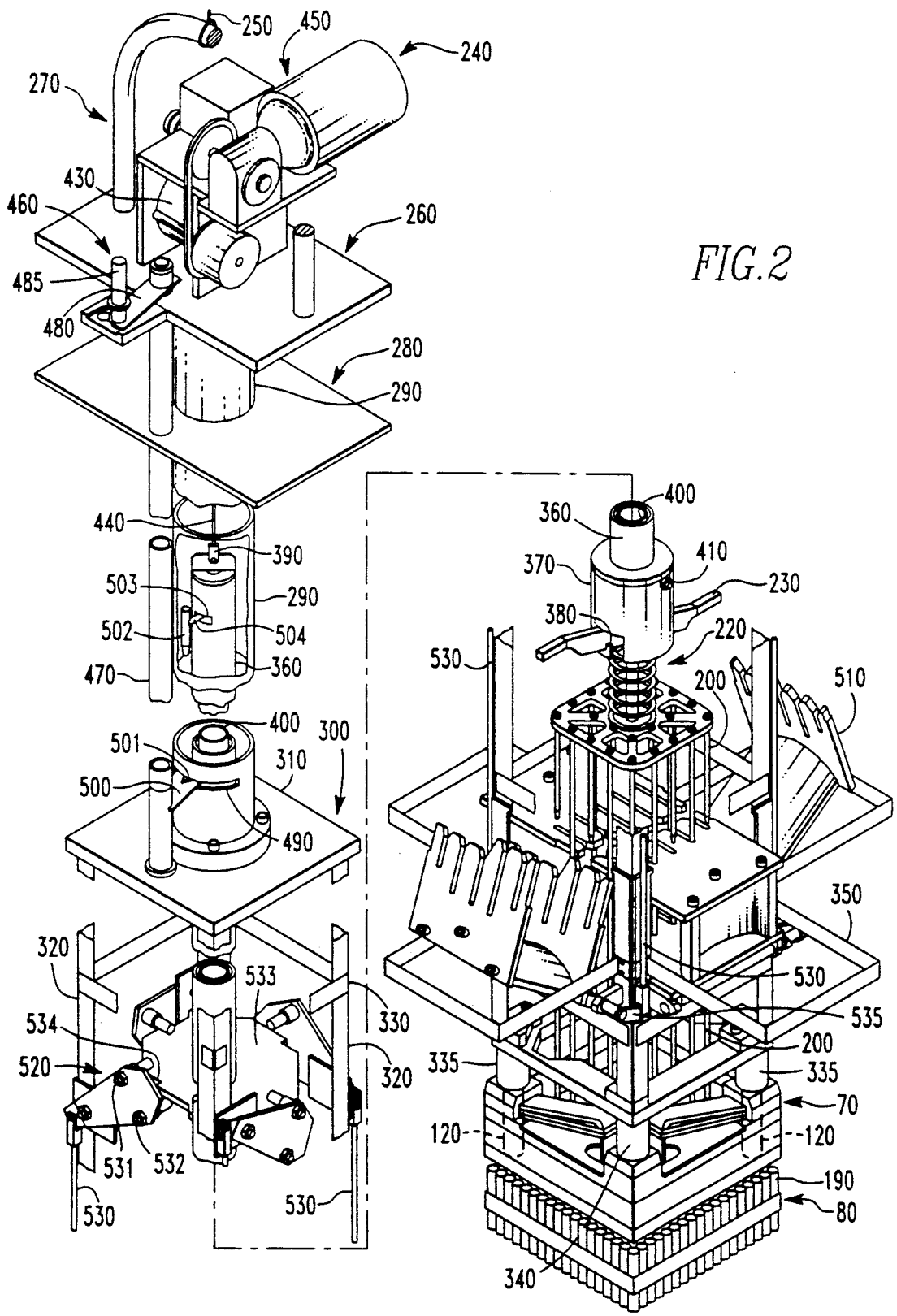
FIG. 2 is a perspective view of a handling tool of the present invention.

Referring to FIG. 2, a handling tool 240 of the present invention is illustrated. The handling tool 240 is suspended upwardly over the fuel rack 30 (not shown in FIG. 2) by a movable bridge (not shown) which is attached to the handling tool 240 by a cable 250 as is well known in the art. The handling tool 240 includes a first platform 260 having a semi-circular shaped arch 270 which is attached to the cable 250. A second platform 280 is disposed downwardly from the first platform 260, and a first hollow, tubular shaped member 290 extends from the first platform 260 and through a center portion of the second platform 280. A generally gazebo shaped main frame 300 is attached to one end of the tubular shaped member 290 for attaching to a fuel cell 70. The main frame 300 includes a rectangular shaped roof. portion 310 having an L-shaped angle 320 extending downwardly at each corner thereof. The L-shaped angles 320 are held together by straps 330 affixed at predetermined elevations along the longitudinal length of the angles 320. A first projection 335 extends from two diagonally opposite corners of the L-shaped angles 320 for engaging the bores 120 of the cell 70. The projections 335, when engaging the bores 120, rigidly join the handling tool 240 to a cell 70. A second projection 340 also extends from two diagonally opposite corners of the L-shaped angles 320 (only one shown in FIG. 2) and rests atop the cell 70 for stabilizing the main frame 300 when it engages the cell 70. A substantially rectangular shaped bumper 350 extends from each side (i.e., four sides total) of a lower portion of the main frame 300 for preventing the main frame 300 from jarring against another cell 70 and thereby damaging the main frame 300.

A second tubular shaped member 360 is disposed within the main frame 300 and is positioned within the first tubular member 290. The second tubular member 360 includes an enlarged portion 370 having two generally J-shaped notches 380 at one end and spaced from each other by approximately one hundred eighty degrees, and a thimble 390 is affixed at the other end of the second tubular shaped member 360. The notches 380 are used for latching onto the T-shaped bar 230 of the poison rod assembly 220. A third tubular shaped member 400 is positioned concentrically inside the second member 360 and conforms substantially the shape of the second member 360. The third tubular member 400, integrally attached to second tubular member 360 by a bolt 410, also has two notches (not shown) in registry with the J-shaped notches 380 of the second tubular member 360 at one end for firmly pressing the T-shaped bar 230 of the poison rod assembly 220 into the J-shaped notches 380 of the second tubular member 360. A winch 430 rests atop the first platform 260, and a cable 440, which extends into the first tubular member 290, is wound around a spool (not shown in FIG. 2) of the winch 430. The cable 440 is attached to the thimble 390 of the second tubular member 360 and is used to either extend or retract both the second and third tubular members 360,400 within the main frame 300 when the winch 430 is operated. A motor assembly 450 is positioned adjacent the winch 430 atop the first platform 260 and is attached thereto for driving the winch 430. The motor assembly 450, when operated, causes the cable 440 of the winch 430 to either pay off the spool or wind onto the spool. An actuator 460 is positioned atop the first platform 260 and is attached to a finger 470 via a portion 480. A handle 485 extends upwardly from the portion 480 for allowing an operator to manipulate the actuator 460. The finger 470 extends through both the first 260 and second platforms 280 and terminates at the roof portion 310 of the main frame 300. One slot 490 is cut through the first tubular member 290 wherein a Y-shaped connecting member 500, which is attached to the finger 470, is positioned. The connecting member 500 includes a hollowed out portion 501 for receiving a pin 502 which is positioned inside the first tubular member 290. One slot 503 is cut through the second tubular members 360 wherein an attaching member 504 is positioned for attaching the pin 502 to the third tubular member 400. The pin 502 is movable upwardly and downwardly and is positioned within the hollowed out portion 501 of the connecting member 500 when winch 430 lowers the cable 440. When in this engaged position, an operator manually turns the handle 485 in an arcuate motion which circularly rotates the finger 470 around its longitudinal axis. This circular rotation is transferred to the third tubular member 400 via the pin 502. The third tubular member 400, in turn, circularly rotates the second tubular member 360 so that the notches (not shown) of the third tubular members 400 may latch onto the T-shaped bar 230 of the poison rod assembly 220. The notches of the second tubular member 400 cooperate with the J-shaped notches 380 and press the T-shaped bar 230 into the J-shaped notches 380. The pin 502 moves upwardly out of the hollowed out portion 501 when the cable 440 is lifted upwardly.

A movable set of comb assemblies 510 are joined to the lower portion of the main frame 300 for matingly surrounding and preventing damage to the poison rod assembly 220 during transit. The comb assemblies 510 are attached to four pivot plates 520 each via a sleeve 530. Each pivot plate 520 includes two elongated bolts 531 and 532 for engaging a center plate 533 which is attached to the second tubular member 360 and moves upwardly and downwardly in conjunction with the second tubular member 360. The center plate 533 has indentations 534 along its edges for allowing the center plate 533 to pass over bolt 531 when the center plate 533 moves downwardly and over bolt 532 when the center plate 533 moves upwardly. To open the comb assemblies 510, the center plate 533 moves downwardly and engages each bolt 532 of the four pivot plates 520 which pivots the pivot plate 520 so that the sleeves 530 moves upwardly. Each sleeve 530 is attached to a portion 535, and this upwardly movement of each sleeve 530 causes the portion 535 to move the comb assembly 510 to the open position. To close the comb assemblies 510, the center plate 533 moves upwardly and engages each bolt 531 of each pivot plate 520 which causes each sleeve 530 to move downwardly and, therefore, closing the comb assemblies 510.

To operate the handling tool 240, the movable bridge is maneuvered over a predetermined fuel assembly 80 which, in turn, positions the handling tool 240 over the fuel assembly 80. The handling tool 240 is suspended over a fuel assembly 80 by the movable bridge and is then lowered, via a hoist of the movable bridge, so that the projections 335 engage the bores 120 in the cell 70. The handling tool 240 is pre-designed so that, when the projections 335 engage the bores 120, the first platform 260 is adjacent a portion of the movable bridge supporting the maintenance personnel for operating the motor assembly 450 and actuator 460. The winch 430, driven by the motor assembly 450, lowers both the second and third tubular members 360,400 adjacent the poison rod assembly 220. The actuator 460 then circularly rotates both the second 360 and third tubular members 400 so that the J-shaped notches 380 of the second tubular member 360 and the notches of the third tubular member 400 cooperate to firmly grip the T-shaped bar 230 of the poison rod assembly 220. Both sets of comb assemblies 510 then close and surround the poison rod assembly 220, and the winch 430 lifts the second tubular member 360 which, in turn, lifts the poison rod assembly 220 from the fuel assembly 80. The movable bridge then lifts the handling tool 240 and maneuvers the entire handling tool 240 over another cell 70 where the process is reversed for re-inserting the poison rod assembly 220 into another fuel assembly 80.

Figure 3:
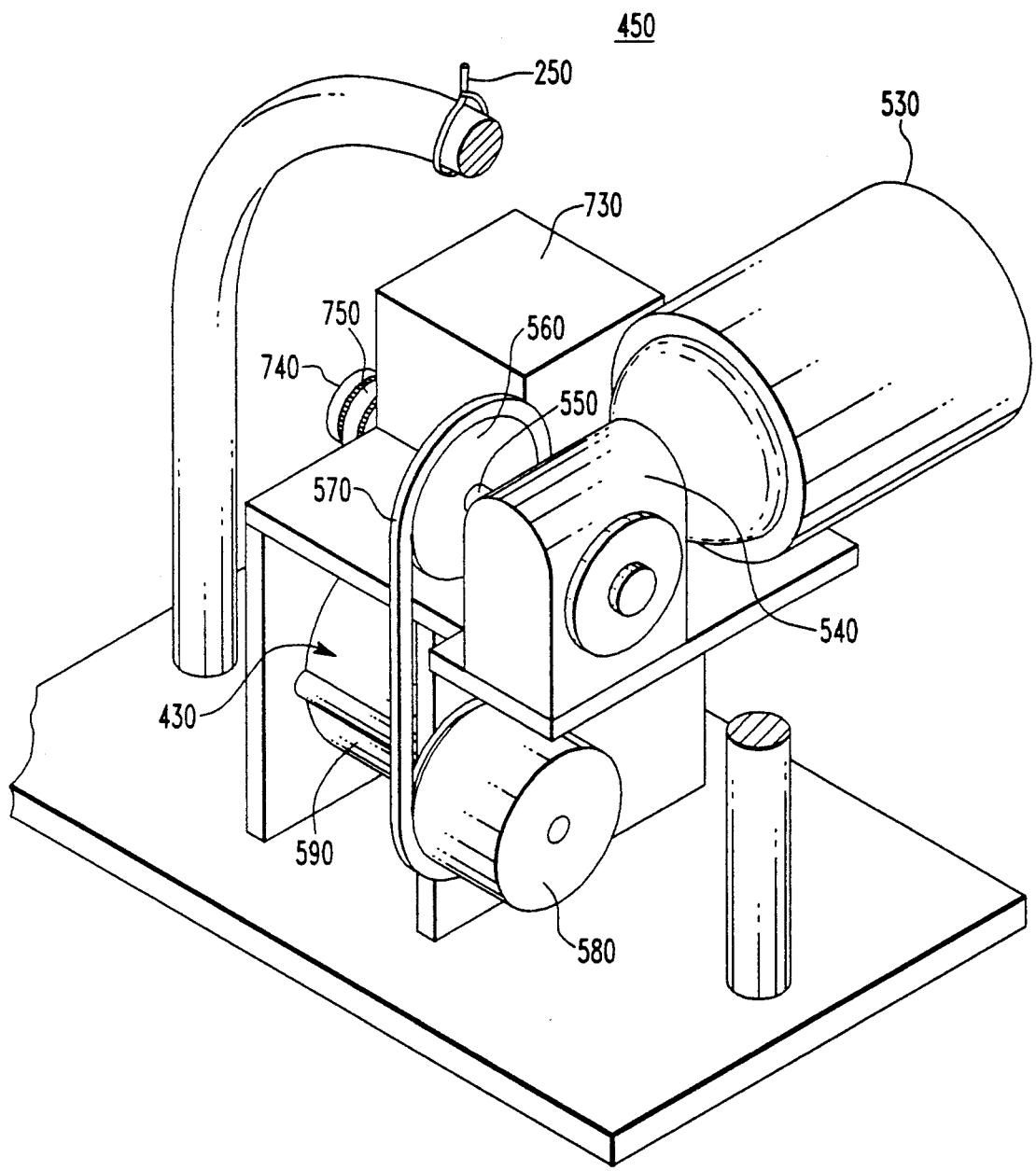
FIG. 3 is a perspective view of a motor assembly of the present invention.

Referring to FIG. 3, the motor assembly 450 of the present invention is shown. The motor assembly 450 includes a motor 530, such as an one half horsepower motor, for creating the force needed to operate the winch 430. A gear reducer 540 is attached to the motor 530 and reduces the shaft speed of the motor 530 to a useable, predetermined speed. The gear reducer 540 includes an axle 550 having a circular, rotatable disc 560 at one end. A drive chain 570 links and passes the mechanical energy of the gear reducer 540 to a torque clutch 580 via the disc 560. The torque clutch 580 functions to stop the motor 530 if a pre-determined amount of resistance is present on the winch 430. This safety mechanism prevents the main frame 300 (not shown in FIG. 3), poison rod assembly 220 (not shown in FIG. 3) or the like from being damaged if they are accidentally caught by any obstruction. The torque clutch 580 includes a cylindrical pinion (not shown in FIG. 3) enclosed by a winch housing 590.

Figure 4:
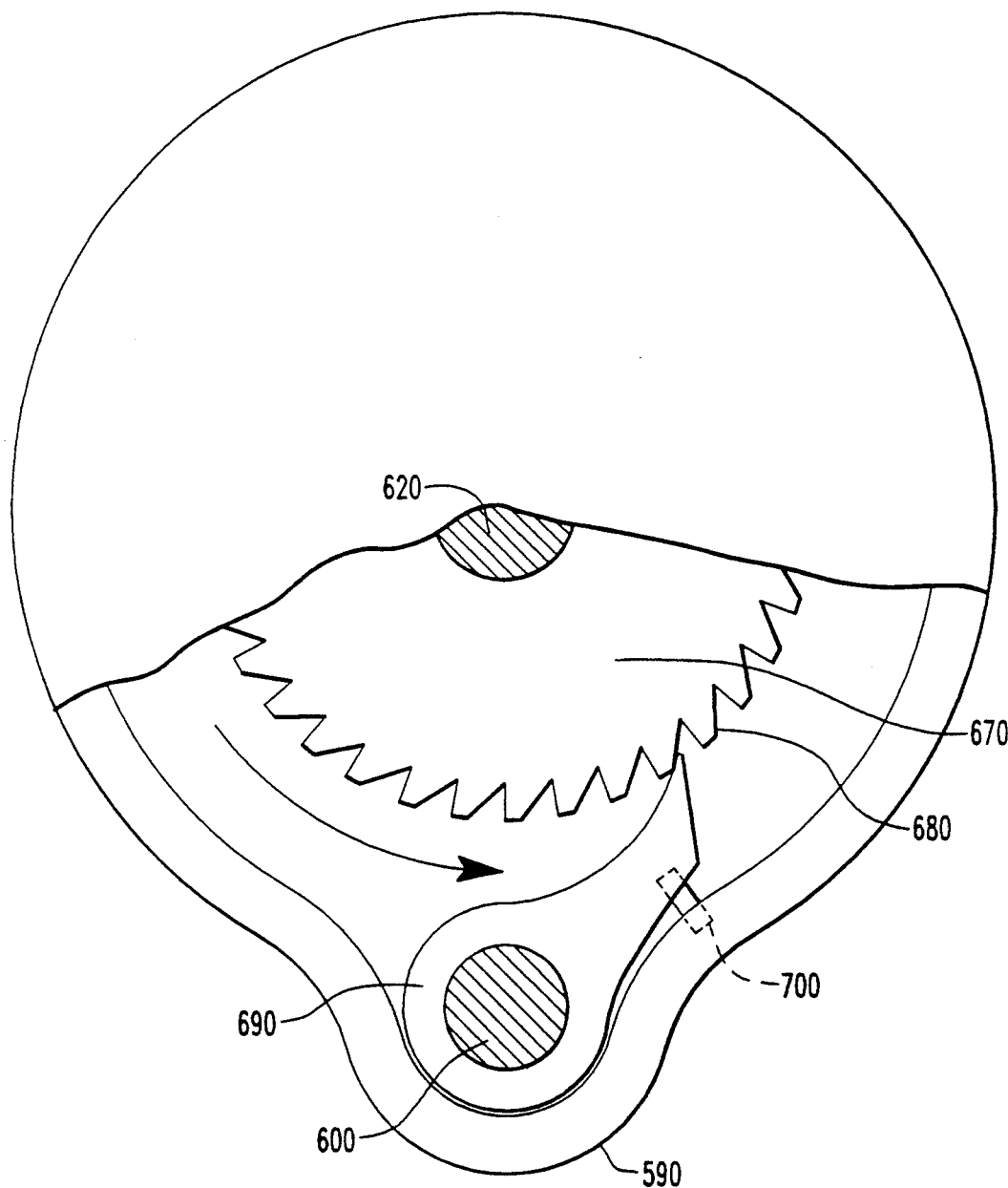
FIG. 4 is a view in vertical cross section of a winch of the motor assembly.
Figure 5:
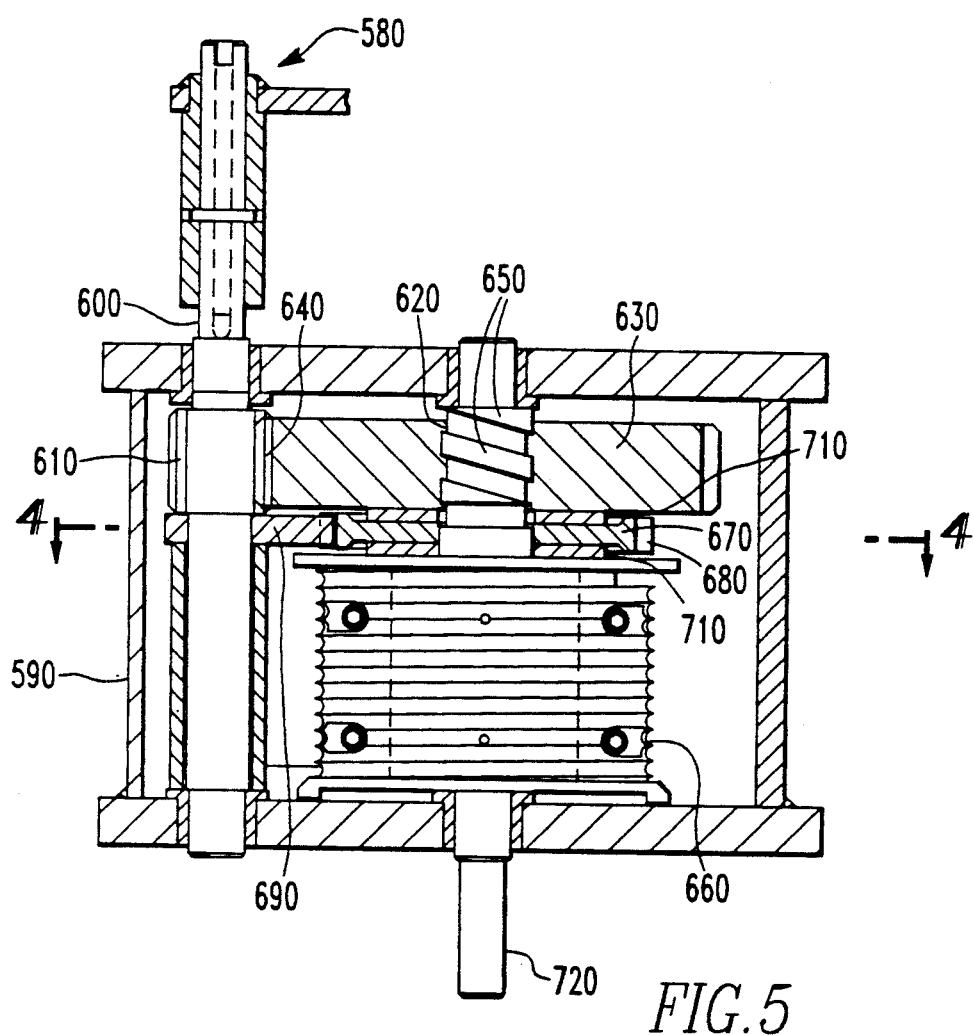
FIG. 5 is a plan view in horizontal cross section of the winch of the present invention.

Referring to FIGS. 4 and 5, the torque clutch 580 includes a cylindrical pinion shaft 600 having a plurality of gear teeth 610 thereon. A cylindrical, rotatable shaft 620 is disposed generally parallel to the pinion shaft 600 and is rotatably attached to a circular gear 630. The gear 630 includes a plurality of gear teeth 640 thereon for engaging the plurality of gear teeth 610 of the pinion shaft 600. The shaft 620 includes threads 650 thereon for moving the gear 630 axially along the shaft 620 when the gear 630 is rotated. The spool 660 is also disposed on the shaft 620 for positioning the cable 440 (not shown) thereon. A circular, rotatable rachet 670 is positioned on the shaft 620 and includes a plurality of gear teeth 680 thereon. A pawl 690 is disposed on the shaft 610 for engaging the gear teeth 680, and allows motion in only one direction when it engages the teeth 680. The pawl 690 and rachet 670 cooperate with each other to form a mechanism for stopping rotation of the spool 660 when they are pressed firmly against the spool 660 by the gear 630. A spring 700 is affixed to the pawl 690 for pressing the pawl 690 against the gear teeth 680. Two circular disks 710 are positioned on the shaft 620 and function as brake padding when the rachet 670 is pressed against the spool 660.

When the cable 440 is wound onto the spool 660 (i.e., retracting the poison rod assembly from a fuel assembly), the pinion shaft 600 rotates which, in turn, rotates the gear 630 concentrically around the shaft and axially toward the spool 660, thereby pressing the rachet 670 and, in turn, one disk 710 against the spool 660. Although the rachet 670 is pressed against the spool 660, the spool 660 freely rotates because the rachet 670 rotates, in the direction indicated by the arrows, and does not lock against the pawl 690. However, if the spool 660 ceases to rotate, the rachet 670 is forced in the direction opposite the arrows and the pawl 690 locks against the rachet 670 which prevents the spool 660 from rotating.

When the cable is unwound from the spool 660 (i.e., positioning a poison rod assembly in a fuel assembly), the pinion shaft 600 rotates in a direction which moves the gear 630 axially along the shaft 620 and away from the spool 660. The rachet 670 is, therefore, not pressed against the spool 660 and the spool 660 freely rotates.

The shaft 620 includes an extension 720 which projects outwardly from the housing 590 at one end of the shaft 620 for passing the number of spool revolutions to a geared limit switch (not shown in FIGS. 4 or 5).

Referring back to FIG. 3, the geared limit switch 730 includes a shaft 740 whereon a timing belt 750, which is connected to the extension 720 (not shown in FIG. 3), is attached. The geared limit switch 730 counts the number of revolutions of its shaft 740 which, in turn, corresponds to number of the revolutions of the spool 660. The number of revolutions of the spool 660 is critical because this information enables the geared limit switch 730 to calculate the extension of the cable 440 on or off the spool 660. The geared limit switch 730 is preset to increase its speed when the cable 440 is neither at full extension nor full retraction. For example, the cable 440 begins its rotation off the spool 660 slowly, then increases its speed once it reaches a preset extension, and then slows again once it nears a cell 70. This speed variation is performed by the geared limit switch 730.

A control box (not shown) is affixed to the motor assembly 450 and is electrically connected to both the geared limit switch 730 and the motor 530. The geared limit switch 730 sends a signal over a wire to the control box when it wants to either increase or decrease its speed. The control box has a relay inside which then switches to the desired contact. The relay, after switching, then sends a signal via a wire to the motor 530 for increasing or decreasing the motor speed to the desired speed.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described merely a preferred or exemplary embodiment thereof.

We claim:

1. A device for transferring a poison rod assembly from one fuel assembly to another fuel assembly, the device comprising:
   a) winch means cooperatively associated with the poison rod assembly for lifting and transferring the poison rod assembly;
   b) a tubular member attached to said winch means at one end and adapted to be attached to the poison rod assembly at its other end for latching onto the poison rod assembly;
   c) motor means attached to said winch means for generating the force to drive said winch means;
   d) an actuator means communicating with said tubular member for moving said tubular member in an arcuate motion for latching said tubular member to the poison rod assembly; and
   wherein said motor means includes a geared limit switch for controlling the speed and travel distance of the repositioning of the poison rod assemblies.

2. The device as in claim 1 wherein said motor means includes a torque limit switch for terminating repositioning of the poison rod assemblies if a predetermined resistance is present on the poison rod assembly.

3. The device as in claim 2 wherein said motor means includes a gear reducer for reducing a rotational speed of said motor.

4. The device as in claim 3 wherein said winch means includes a cable attached to said tubular member for lifting and repositioning the poison rod assembly.

* * * * *